(12) United States Patent
Kobayashi

(10) Patent No.: US 11,603,598 B2
(45) Date of Patent: Mar. 14, 2023

(54) BACK-ILLUMINATED PHOTOELECTROCHEMICAL CELL

(71) Applicant: The Regents of the University of California, Oakland, CA (US)

(72) Inventor: Nobuhiko Kobayashi, Sunnyvale, CA (US)

(73) Assignee: The Regents of the University of California, Oakland, CA (US)

( * ) Notice: Subject to any disclaimer, the term of this patent is extended or adjusted under 35 U.S.C. 154(b) by 518 days.

(21) Appl. No.: 16/818,923

(22) Filed: Mar. 13, 2020

(65) Prior Publication Data

US 2020/0291533 A1 Sep. 17, 2020

Related U.S. Application Data

(60) Provisional application No. 62/818,572, filed on Mar. 14, 2019.

(51) Int. Cl.
| | | |
|---|---|---|
| *C25B 1/55* | (2021.01) | |
| *C25B 1/04* | (2021.01) | |
| *C25B 11/059* | (2021.01) | |
| *C25B 11/049* | (2021.01) | |
| *C25B 11/04* | (2021.01) | |
| *C25B 9/50* | (2021.01) | |

(52) U.S. Cl.
CPC .............. *C25B 1/55* (2021.01); *C25B 1/04* (2013.01); *C25B 9/50* (2021.01); *C25B 11/04* (2013.01); *C25B 11/049* (2021.01); *C25B 11/059* (2021.01)

(58) Field of Classification Search
CPC .......... C25B 1/55; C25B 9/50; C25B 11/049; C25B 11/059; Y02E 60/36
See application file for complete search history.

(56) References Cited

U.S. PATENT DOCUMENTS

| | | | |
|---|---|---|---|
| 2007/0017794 A1* | 1/2007 | Highgate | C25B 1/55 204/157.15 |
| 2010/0133111 A1* | 6/2010 | Nocera | C25B 1/55 205/633 |
| 2013/0101255 A1* | 4/2013 | Klimowych | G02B 6/26 385/50 |

(Continued)

OTHER PUBLICATIONS

English Translation of Zhang et al, CN-106319556-A, Jan. 2017 (Year: 2017).*

(Continued)

*Primary Examiner* — Salil Jain
(74) *Attorney, Agent, or Firm* — Lumen Patent Firm

(57) ABSTRACT

A photoelectrochemical cell includes a cathode with a front and back cathode surface, an anode with front and back anode surfaces, a conductive connector between the cathode and the anode, and an optical waveguide configured to direct sunlight to the back surfaces of the cathode and anode. The cathode is adapted for photoelectric generation of electrons at the back cathode surface and electrolytic generation of hydrogen at the front cathode surface. Similarly, the anode is adapted for photoelectric generation of electrons at the back anode surface and electrolytic generation of oxygen at the front anode surface. The photoelectrochemical cell may also include a waveguide optical concentrator coupled to the waveguide.

19 Claims, 9 Drawing Sheets

(56) References Cited

U.S. PATENT DOCUMENTS

| | | | | |
|---|---|---|---|---|
| 2014/0021034 A1* | 1/2014 | Lewis | ............... | C25B 1/55 |
| | | | | 204/267 |
| 2014/0231246 A1* | 8/2014 | Mozer | ............... | C25B 1/04 |
| | | | | 204/242 |
| 2018/0251903 A1* | 9/2018 | Xiang | ............... | C25B 11/075 |

OTHER PUBLICATIONS

Sun et al., Composite photoanodes for photoelectrochemical solar water splitting. Energy Environ. Sci., 2010,3, 1252-1261.

Carver et al., Modelling and development of photoelectrochemical reactor for H2 production. International Journal of Hydrogen Energy vol. 37, Issue 3, Feb. 2012, pp. 2911-2923.

Currao. Photoelectrochemical Water Splitting. CHIMIA International Journal for Chemistry, vol. 61, No. 12, Dec. 2007, pp. 815-819(5).

Navarro Yerga. Water Splitting on Semiconductor Catalysts under Visible-Light Irradiation. ChemSusChem vol. 2. Jun. 22, 2009 pp. 471-485.

Khaselev et al., A Monolithic Photovoltaic-Photoelectrochemical Device for Hydrogen Production Via Water Splitting. Science Apr. 17, 1998: vol. 280, Issue 5362, pp. 425-427.

* cited by examiner

BACK-ILLUMINATED PHOTOELECTROCHEMICAL CELL

CROSS-REFERENCE TO RELATED APPLICATIONS

This application claims priority from U.S. Provisional Patent Application 62/818,572 filed Mar. 14, 2019, which is incorporated herein by reference.

STATEMENT REGARDING FEDERALLY SPONSORED RESEARCH OR DEVELOPMENT

None.

FIELD OF THE INVENTION

The present invention relates generally to devices and method for water splitting. More specifically, it relates to photoelectrochemical solar-powered water splitting.

BACKGROUND OF THE INVENTION

Hydrogen ($H_2$) is a promising clean fuel that can be generated by splitting water using sunlight. One approach for solar water splitting is photovoltaic electrolysis, illustrated in FIG. 1A. Sunlight 100 incident on a photovoltaic (PV) cell 102 generates an electric potential that is applied to a cathode 104 and anode 106 submerged in an electrolyte solution. Water in the solution is split to generate hydrogen at the cathode and oxygen at the anode. Photocatalytic water splitting, illustrated in FIG. 1B is a much simpler approach (i.e., there is no need for PV cells) to hydrogen generation. Sunlight 108 enters a solution and is absorbed by semiconductor photocatalyst particles 110, producing hydrogen and oxygen on the particle surface. Hydrogen bubbles, however, interfere with the propagation of the sunlight to the particle surface and degrade performance. The generated hydrogen and oxygen are also difficult to separate. An approach that allows easier separation of the hydrogen and oxygen uses a photoelectrochemical cell (i.e., photoelectrolytic cell), as shown in FIG. 1C. Sunlight 112 enters an electrolyte solution and is absorbed at the surface of a cathode 114, producing hydrogen on the same surface. An anode 116 electrically connected to the cathode produces oxygen at its surface. Although this approach allows separation of the generated hydrogen and oxygen, hydrogen bubbles at the cathode surface still interfere with the propagation of the sunlight and degrade performance. Thus, although splitting water into $H_2$ and $O_2$ by photoelectrochemical (PEC) approaches is advantageous, in particular for remote applications, because of its reliability and minimal maintenance, there remain unsolved problems with the approach.

BRIEF SUMMARY OF THE INVENTION

The present invention relates to a photoelectrochemical (PEC) cell with a pair of photoelectrodes and, in preferred embodiments, a waveguide solar concentrator. The photoelectrodes are back-illuminated by sunlight guided through an optical waveguide. The PEC cell spatially and temporally decouples photoelectric generation of electron-hole pairs by sunlight from the electrolytic transfer of electrical charges from/to electrolyte to produce $H_2$, In contrast with conventional photoelectrochemical designs where these two processes occur simultaneously on the same surface of a photoelectrode, in the present PEC design these processes take place on opposite surfaces of a photoelectrode. As a result, hydrogen bubbles on the front side of the electrode do not interfere with the illumination of the back side of the electrode. Moreover, this design allows sunlight to be concentrated before it is guided to the backside of the cathode, allowing photon flux higher than conventional PEC designs.

The separation of the photoelectric and electrolytic processes allows flexible selection of electrode materials and tuning of their semiconductor bandgaps to increase efficiencies of both processes and to allow the use electrolytes with a wide range of pH (e.g., using $H^+$ or $OH^-$). This is particularly advantageous when seawater (pH~8.1) is used as an electrolyte. This aspect also benefits the flexibility of choice of base materials and photocatalyst to avoid materials that need to withstand acidic electrolyte, helping to reduce overall cost for large-scale implementation. Separation of the photoelectric and electrolytic processes allows one to optimize performance and dependability of each process independently offering highly-scalable and robust $H_2$ generation systems.

In one aspect of the invention, a photoelectrochemical cell has at least one semiconductor electrode designed to be illumined by sunlight on one side and generate hydrogen on the opposite side. The semiconductor electrode is made of two materials with different band gaps at opposite sides, designed for efficient transfer of electrons and holes at their interface. The device has two electrodes, a cathode and anode, which may be made of different semiconductor materials. The two electrodes are electrically connected, e.g., with a conductor integrated in a waveguide that concentrates and delivers sunlight to the back surface of one or both of the electrodes.

In one aspect, the invention provides a photoelectrochemical cell comprising: a cathode comprising a first semiconductor, a front cathode surface, and a back cathode surface opposite the front surface; an anode comprising a second semiconductor or a metal, and a front anode surface, a back anode surface opposite the front surface; an electrically conductive material connecting the cathode and the anode; and an optical waveguide comprising a proximal end coupled to the back cathode surface and to the back anode surface, and a distal end configured to couple sunlight into the waveguide; wherein the cathode is adapted for photoelectric generation of electrons at the back cathode surface and electrolytic generation of hydrogen at the front cathode surface; wherein the anode is adapted for photoelectric generation of electrons at the back anode surface and electrolytic generation of oxygen at the front anode surface.

Preferably, the cathode comprises semiconductor materials with different band gaps at the front cathode surface and the back cathode surface. A back bandgap at the back cathode surface may be optimized for photoelectric generation of electron hole pairs by incident sunlight, and a front bandgap at the front cathode surface may be optimized for electrolytic production of hydrogen.

The cathode may comprise a single crystalline, polycrystalline, or noncrystalline semiconductor; a Group IV semiconductor; Si, SiC, or SiGe; a Group III-V semiconductor and related alloys; GaAs, GaP, InP, InGaP, or CuInGaSn; a Group II-VI semiconductor; CdSe, ZnS, or CdTe; a metal oxide; or $Cu_2O$. The anode may comprise a Group II-VI semiconductor; ZnSe; a metal oxide; ZnO, $WO_3$, $TiO_2$, $FeTiO_3$, $In_2O_3$, $SrTiO_3$, or $KTaO_3$; or a metallic element and related alloys Pt, Ru, Ni, Fe, Cr, Au, Cu, or Ag.

The electrically conductive material may be embedded in the optical waveguide. The photoelectrochemical cell may include a tapered optical waveguide concentrator at a distal end of the optical waveguide. The photoelectrochemical may comprise a first housing encompassing the cathode, and a second housing encompassing the anode.

DETAILED DESCRIPTION OF THE INVENTION

Disclosed herein are systems and methods for photoelectrochemical water splitting that spatially and temporally separates the photoelectric and electrolytic processes in a photoelectrochemical cell with a cathode adapted to be illumined by sunlight from the back surface, i.e., the surface opposite the front surface where hydrogen is formed. Photon flux at the cathode surface is higher in the disclosed photoelectrochemical cell because hydrogen bubbles forming at the front surface do not interfere with the illumination of the back surface. In addition, a solar concentrator can provide increased intensity of the back surface illumination.

Figure 1A:
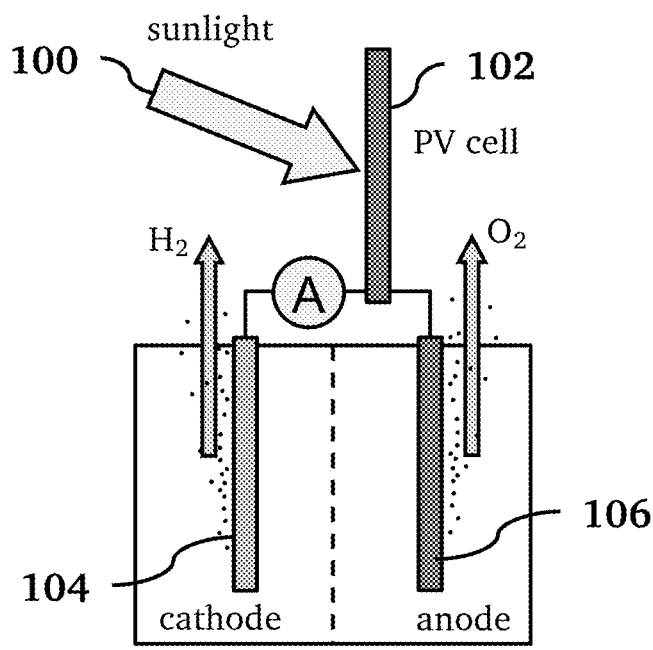
FIGS. 1A, 1B, 1C illustrate three types of solar water splitting approaches: photovoltaic, photocatalytic, and photoelectrochemical, respectively.
Figure 1B:
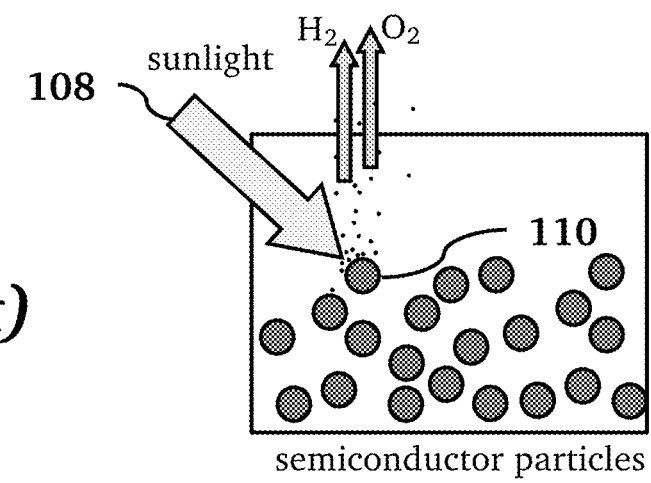
Figure 1C:
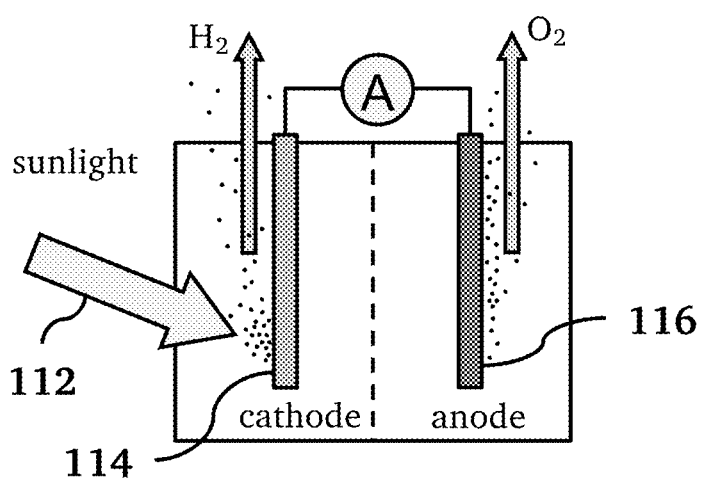
Figure 2A:
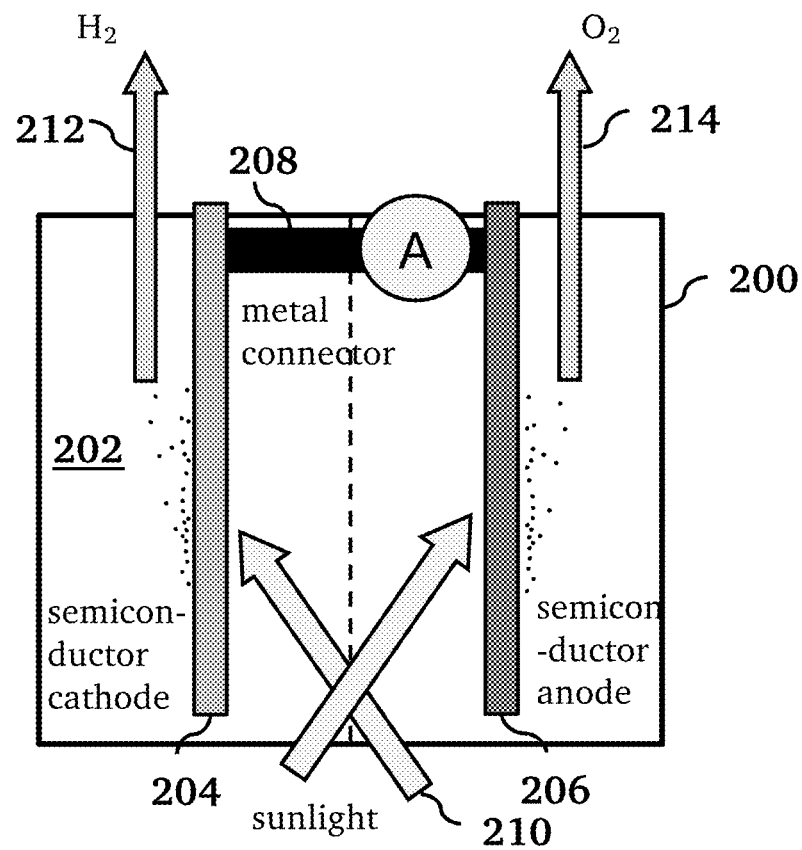
FIGS. 2A, 2B illustrate two embodiments of a photoelectrochemical cell for solar water splitting using backside illumination.

FIG. 2A illustrates a photoelectrochemical cell for solar water splitting using backside illumination, according to an embodiment of the invention. The device has a housing 200 containing an electrolyte 202, a semiconductor cathode 204, a semiconductor anode 206, and an electrically conductive material 208 connecting the cathode and anode. The cathode 204 and anode 206 may be composed of two different semiconductors. Alternatively, the cathode may be a semiconductor and the anode may be a metal. The housing may comprise a first half encompassing the cathode, a second half encompassing the anode.

The device is configured so that sunlight 210 entering the device is directed to the back side surfaces of the cathode 204 and anode 206, resulting in photoelectric generation of electrons and holes at the back surfaces. At the opposite front surfaces hydrogen 212 and oxygen 214 are formed at cathode 204 and anode 206, respectively, and rise up through the electrolyte 202 where they may be captured and stored. The housing is configured such that gas produced at the cathode is kept separate from gas produced at the anode. In still further embodiments, the housing is fitted with a system that allows for continuous and/or periodic evacuation of the gas from the housing, sensors to monitor accumulation of gas, controllers to actuate the system to evacuate the gas (which can in turn be based on data from the sensors) and systems that couple the housing to one or more storage tanks for the gas. Alternatively, the housing can feed into a system that consumes the gas. It is noted that, in addition to normal operation with sunlight, the disclosed photoelectrochemical cell can also comprise a system that applies an electrical voltage across the anode and the cathode to produce the gas when no light is available.

Figure 2B:
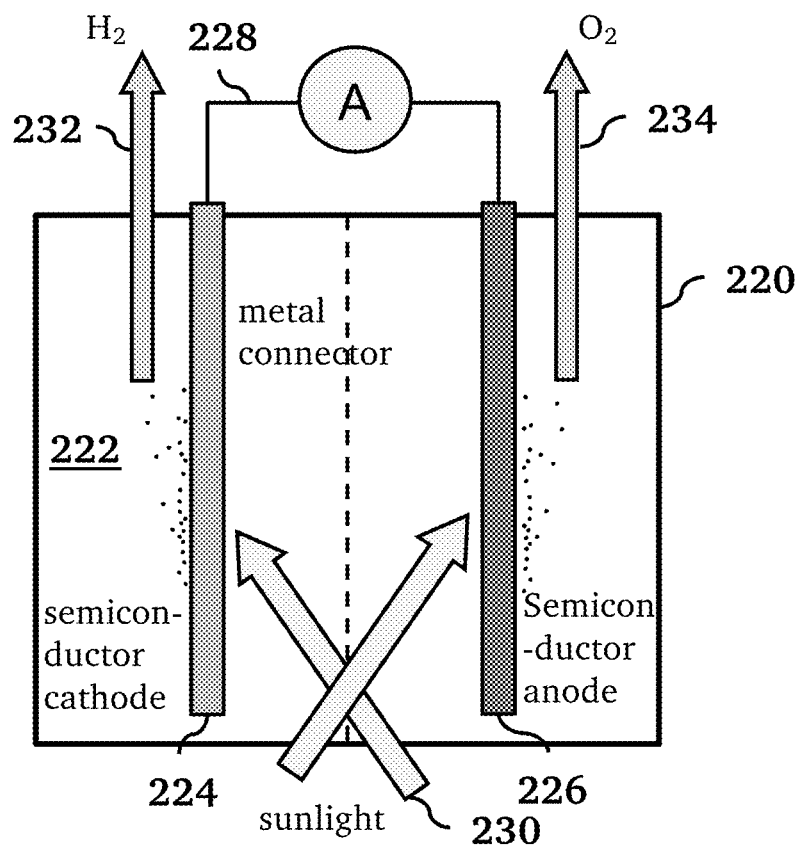

FIG. 2B illustrates another configuration of photoelectrochemical cell for solar water splitting using backside illumination, according to an embodiment of the invention. The device has a housing 220 containing an electrolyte 222, a semiconductor cathode 224, a semiconductor anode 226, and an electrically conductive material 228 connecting the cathode and anode. The cathode 224 and anode 226 may be composed of two different semiconductors. Alternatively, the cathode may be a semiconductor and the anode may be a metal. The housing may comprise a first half encompassing the cathode, a second half encompassing the anode. Similar to FIG. 2A, the device is configured so that sunlight 230 entering the device is directed to the back side surfaces of the cathode 224 and anode 226, resulting in photoelectric generation of electrons and holes at the back surfaces. At the opposite front surfaces hydrogen 232 and oxygen 234 are formed at cathode 224 and anode 226, respectively, and rise up through the electrolyte 222 where they may be captured and stored.

Figure 3A:
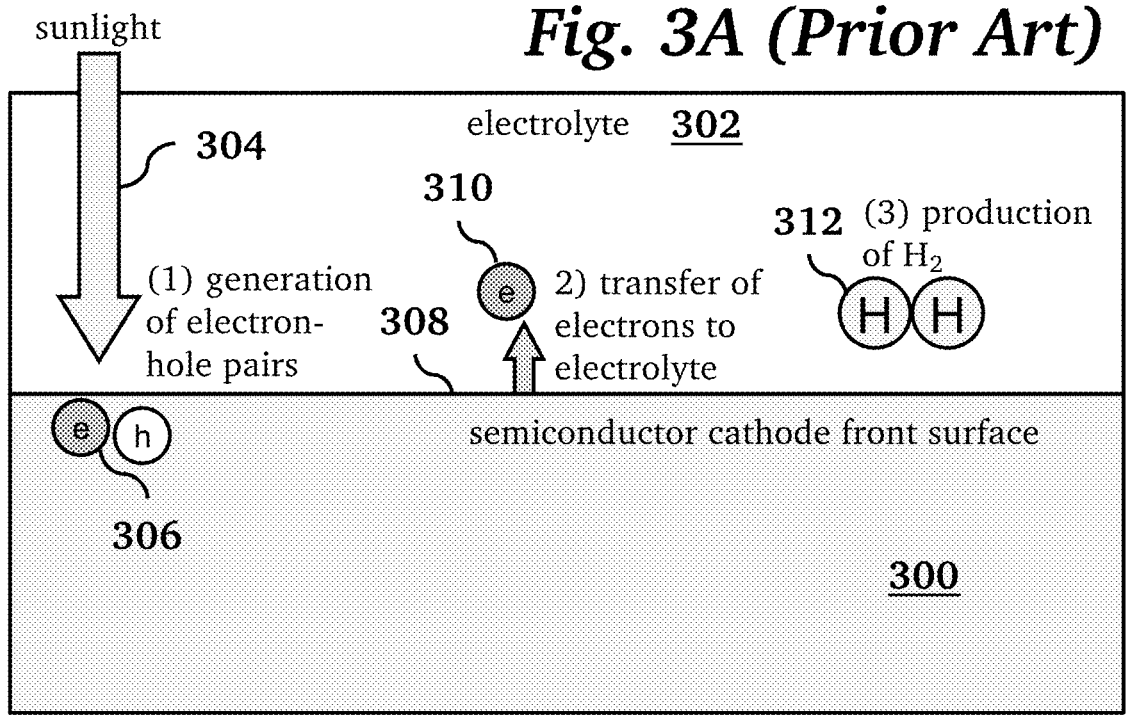
FIG. 3A is a schematic diagram illustrating processes in a conventional PEC cell in which the photoelectric and electrolytic processes both occur on the same surface of the cathode.

In contrast with conventional photoelectrochemical cells, where the photoelectric and electrolytic processes take place on the same surface of the cathode, in embodiments of the present invention the photoelectric and electrolytic processes are separated and take place at opposite sides of the cathode. This difference is illustrated by contrasting FIG. 3A and FIG. 3B. The processes in a conventional PEC cell is shown in FIG. 3A, where the photoelectric and electrolytic processes both occur on the same surface of the cathode. Specifically, sunlight 304 passes through an electrolyte 302 and illuminates a front surface 308 of a cathode 300, resulting in photoelectric generation of an electron-hole pair 306. Also at the front surface 308, an electron 310 transfers to the electrolyte 302, resulting in the electrolytic production of hydrogen 312. Because both photoelectric and electrolytic processes take place at the same surface, generated hydrogen bubbles in the electrolyte 302 interfere with the incident sunlight 304 passing through the electrolyte 302. Another disadvantage is that the front surface material of the cathode must simultaneously be suitable for photoelectric and electrolytic processes, which can impose severe constraints that limit performance of the device.

Figure 3B:
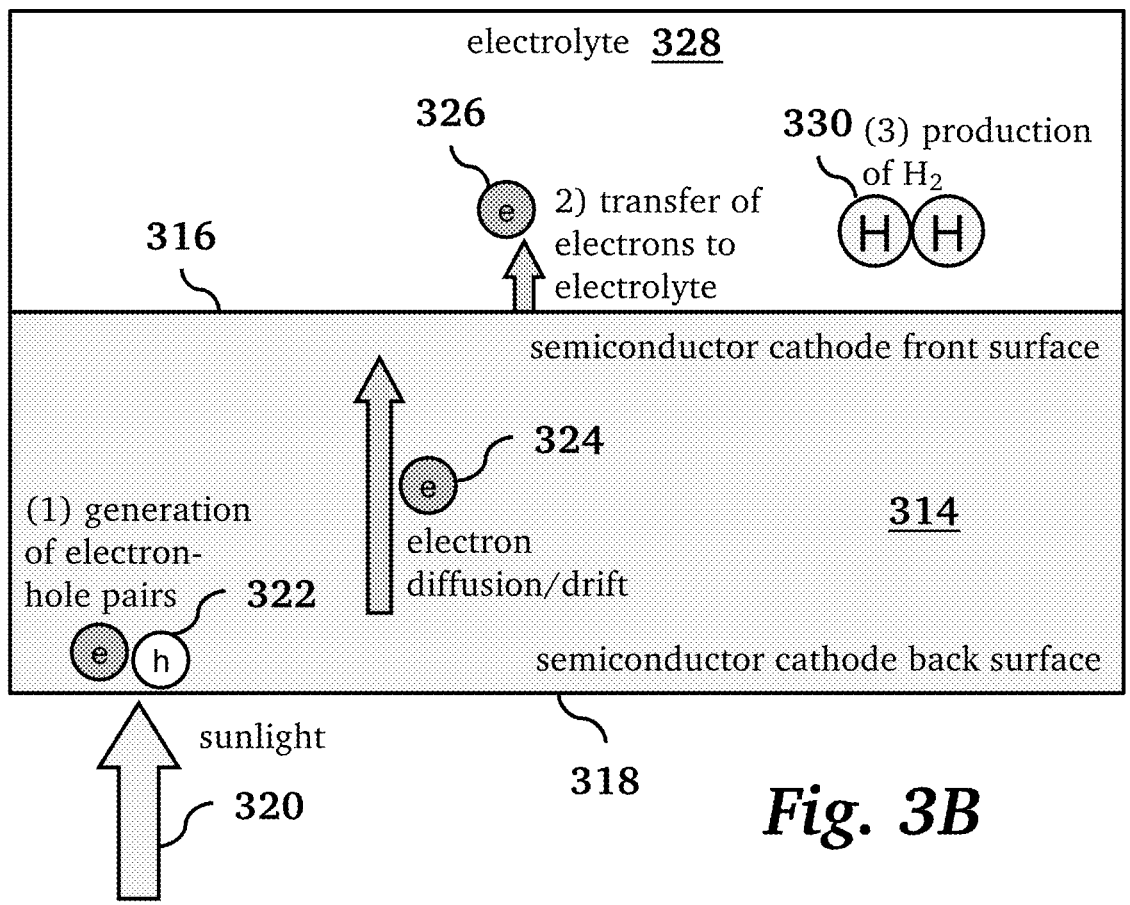
FIG. 3B is a schematic diagram illustrating processes in a PEC cell according to an embodiment of the invention in which the photoelectric and electrolytic processes occur on opposite sides of the cathode, where electron diffusion takes place from the back surface to the front surface.

In contrast, with the conventional design, FIG. 3B illustrates the process in a PEC cell according to an embodiment of the present invention, where the photoelectric and electrolytic processes occur on opposite surfaces of the cathode. Specifically, sunlight 320 directly illuminates the back surface 318 of a semiconductor cathode 314, resulting in photoelectric generation of an electron-hole pair 322. The electron 324 diffuses or drifts from the back surface 318 to the front surface 316 of the cathode 314. The electron 326 then transfers from the front surface 316 to the electrolyte 328 where electrolytic generation of hydrogen 330 takes place.

Because the photoelectric and electrolytic processes occur on opposite surfaces of the cathode, the hydrogen bubbles in the electrolyte on the front side of the cathode do not interfere with and reduce the intensity of sunlight illuminating the back side. Moreover, with the processes separated, the cathode material can be a composite material, with a first material on the back surface optimized for the photoelectric process and a second material on the front surface optimized for the electrolytic process.

The cathode is configured to allow generation of electron-hole pairs on the back surface in response to incident light, the transport of the generated electrons from the back surface through the cathode to the front surface, and the transfer of electrons to the electrolyte on the front surface of the cathode resulting in generation of hydrogen gas. This design decouples, both spatially and temporally, the photoelectric generation of electron-hole pairs from the transfer of electrons to the electrolyte and electrolytic generation of hydrogen, allowing these processes to be optimized independently.

Figure 4:
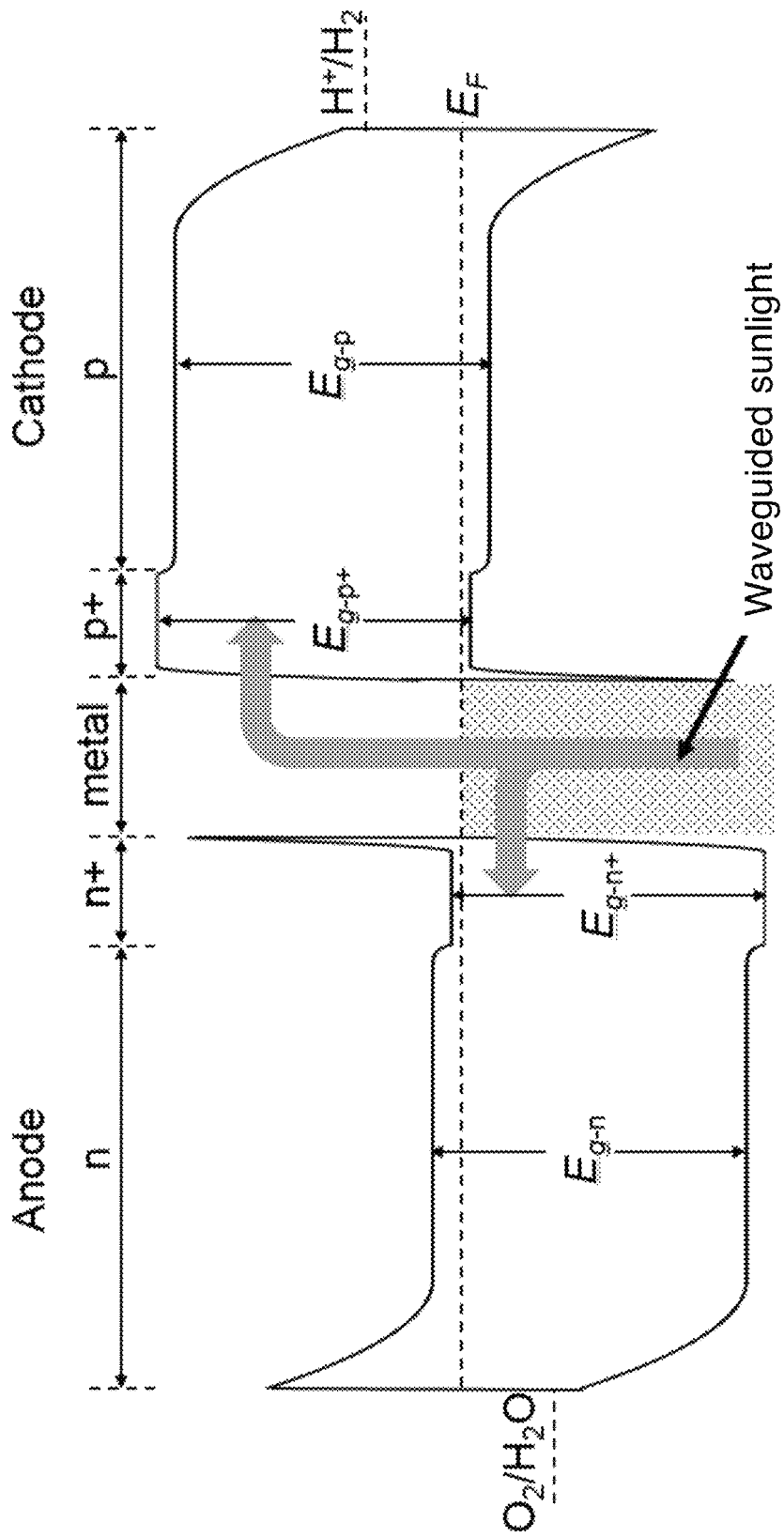
FIG. 4 is an equilibrium band diagram of homo-type semiconductor-metal-semiconductor photoelectrochemical electrode (SMS-PEC) according to an embodiment of the invention.
Figure 5:
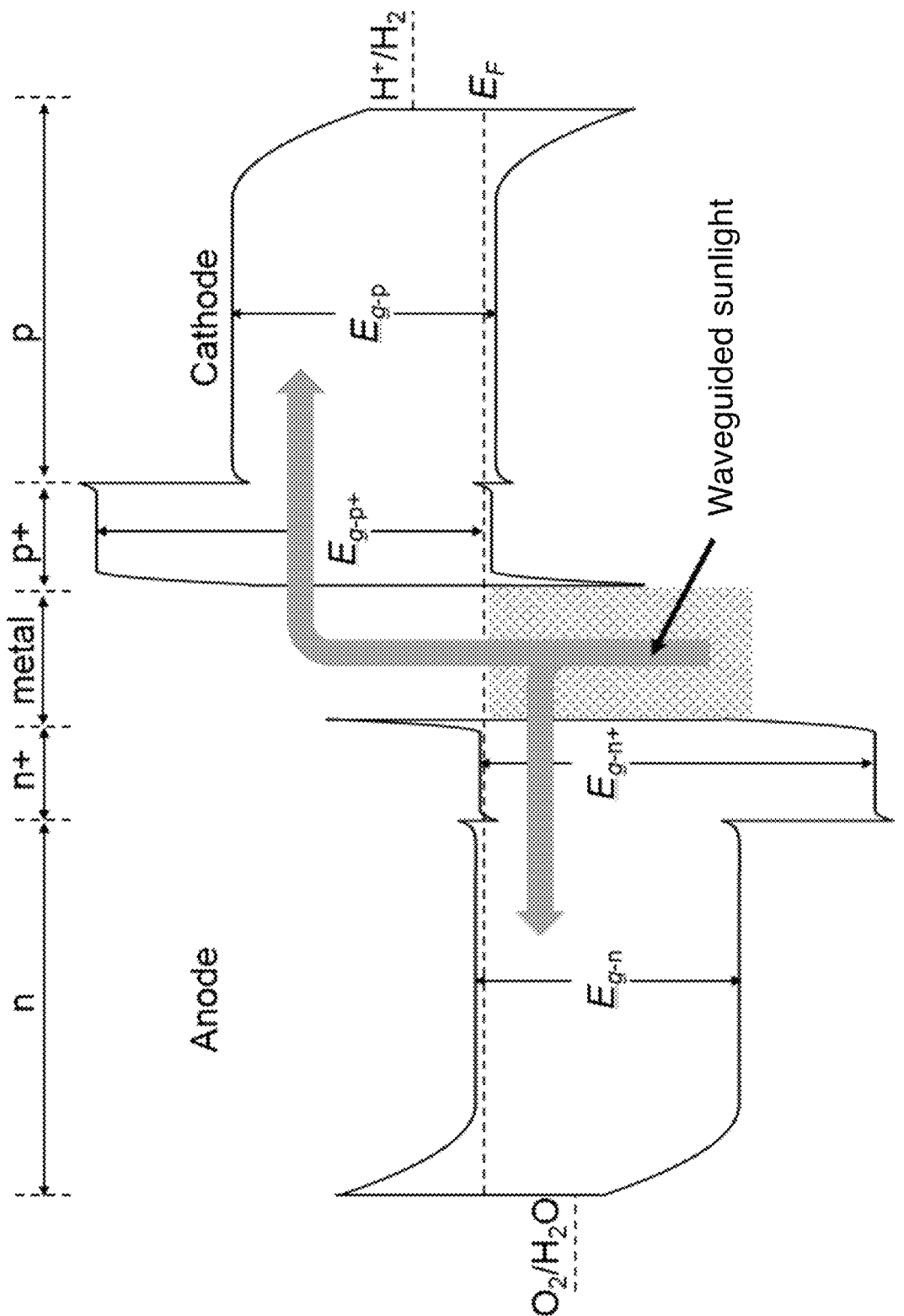
FIG. 5 is an equilibrium band diagram of hetero-type semiconductor-metal-semiconductor photoelectrochemical electrode (SMS-PEC) according to an embodiment of the invention.

In the disclosed photoelectrochemical cell, bandgap engineering as exemplified in FIG. 4 and FIG. 5 can be used in the selection of a particular set of semiconductors that can allow optimal production of hydrogen using electrolytes with a wide pH range (i.e., either using H+ or OH−). For example, semiconductors that optimally produce hydrogen from a seawater (pH ~8.1) electrolyte can be selected. Alternatively, semiconductors that do not need to withstand acidic electrolytes can be selected.

Embodiments of the photoelectric cell may use electrodes composed of semiconductor heterostructures tuned by bandgap engineering for photoelectrodes and protection coatings. For instance, the photoelectrode may comprise semiconductor binary alloys comprising a Group III element such as Ga, In, or Al and a Group V element such as As, P, Sb, N, or Bi. Examples of such binary alloys include InP, GaP, InN, or GaN. Other materials for electrodes can include metal oxides and nitrides such as $Cu_2O$, $Fe_2O_3$, $Ta_3N_5$. What electrode material is used depends on what electrocatalytic material is used.

Figure 6A:
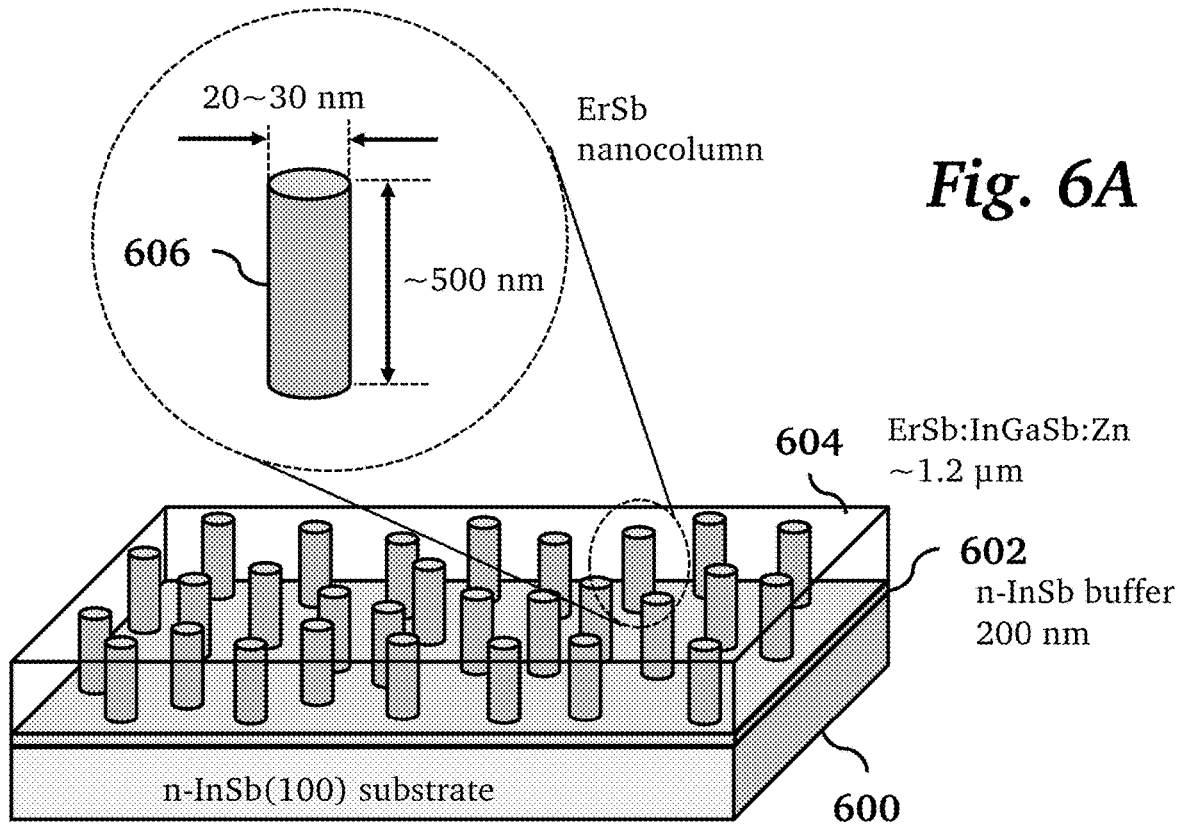
FIG. 6A is a schematic diagram of a semiconductor electrode material composed of InGaSb with ErSb, according to an embodiment of the invention.
Figure 6B:
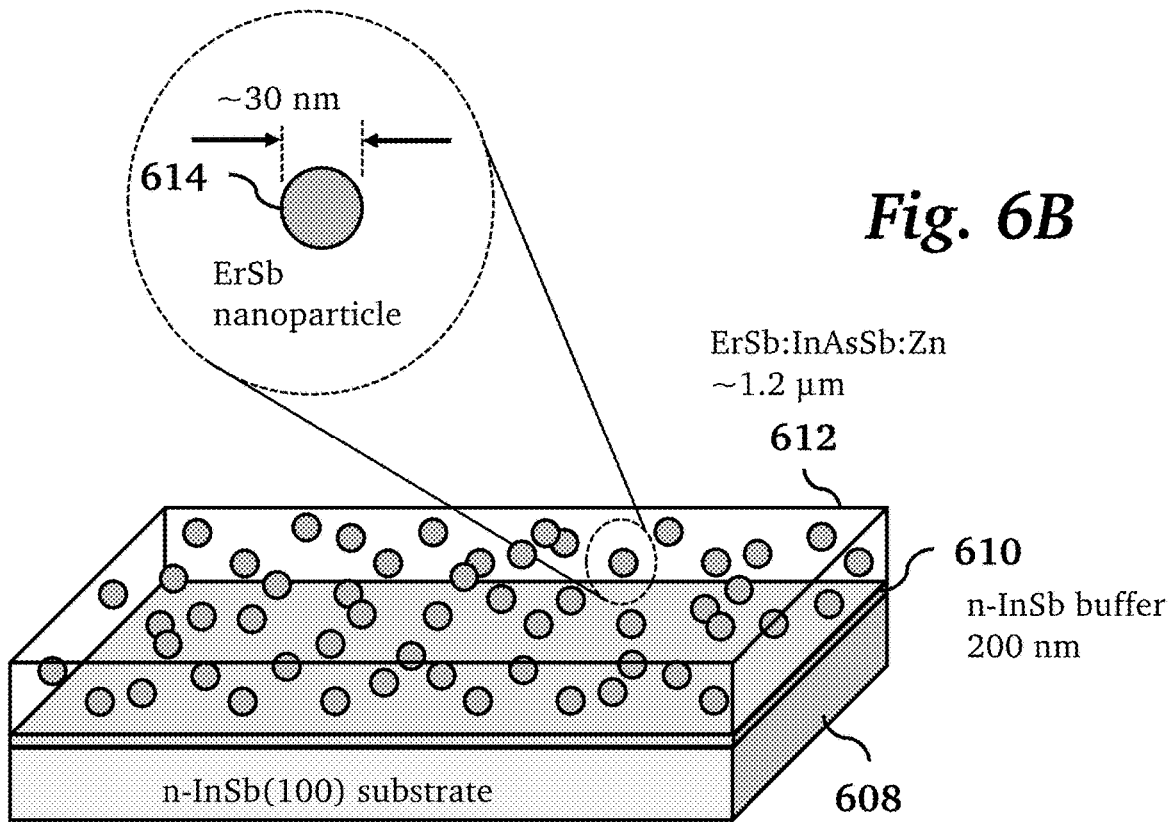
FIG. 6B is a schematic diagram of a semiconductor electrode material composed of InAsSb with ErSb grown by metal organic chemical vapor deposition, according to an embodiment of the invention.

In some embodiments, the disclosed photoelectric cell uses complex semiconductor alloys. Preferably, said compound semiconductor alloys have minimal structural defects. Examples include InGaSb and InAsSb. (FIG. 6A, 6B)

In still further embodiments, the disclosed photoelectric cell uses single crystal, polycrystal, or amorphous semiconductors. However, of these examples, single crystal photoelectric cells are most efficient at generating and transporting electrons and holes. Polycrystals are the next most efficient while amorphous semiconductors are the least efficient.

Any of a number of semiconductor materials have bandgap energy suitable for absorbing the solar spectrum can be used to construct the cathode. These include single-crystalline (SC), poly-crystalline (PC), and non-crystalline (NC) semiconductors. Specific examples of these include SC/PC/NC silicon, SC/PC/NC cadmium telluride, SC/PC/NC copper indium gallium selenide, SC/PC/NC Group III-V and II-VI compound semiconductors, and a range of perovskite and organic semiconductors. One of skill in the art in light of this disclosure can select materials that maximize both photoelectric and electrolytic properties.

FIG. 4 is an equilibrium band diagram of homo-type semiconductor-metal-semiconductor photoelectrochemical electrode (SMS-PEC) according to an embodiment of the invention. This embodiment comprises an n-type semiconductor anode and a p-type semiconductor cathode. These semiconductors have bandgap energies, $E_{g-n}$, $E_{g-n+}$, $E_{g-p}$, and $E_{g-p}+$, of 2 eV (i.e., homo-type n/n+ and p/p+ anode and cathode) connected through a metal. On the cathode side, sunlight enters the p+ semiconductor and generates electron-hole pairs. Using the band diagram, one of skill in the art can use principles of bandgap engineering to select materials that provide electrode properties suitable for use in devices of the present invention. The electrons move toward the electrolyte interface and reduce H+ while the holes are swept to reach the metal.

FIG. 5 is an equilibrium band diagram of hetero-type semiconductor-metal-semiconductor photoelectrochemical electrode (SMS-PEC) according to an embodiment of the invention. This embodiment comprises an n-type semiconductor anode and a p-type semiconductor cathode with different bandgap energies of 3 eV and 2 eV (i.e., hetero-type n/n+ and p/p+ anode and cathode) connected through a metal. Using the band diagram, one of skill in the art can select materials that provide suitable electrode properties. On the cathode side, sunlight enters the p+ semiconductor layer but it is not absorbed by the p+ semiconductor layer, thereby reaching the p semiconductor layer and generating electron-hole pairs without loss. The electrons move toward the electrolyte interface and reduce H+ while the holes are swept to reach the metal. The potential spikes in the valence band at the p+/p interface can be reduced to ensure efficient transport of holes toward the metal.

FIG. 6A is a schematic diagram of a semiconductor electrode material composed of InGaSb (i.e., a semiconductor) with ErSb (i.e., a metallic material), according to an embodiment of the invention. The electrode is composed of an n-InSb(100) substrate 600, upon which is a 200 nm thick n-InSb buffer layer 602. On the buffer layer 602 is a 1.2 μm thick layer of InGaSb 604 with ErSb nanocolumns 606 embedded in it. In another example, FIG. 6B is a schematic diagram of a semiconductor electrode material composed of InAsSb with ErSb grown by metal organic chemical vapor deposition, according to an embodiment of the invention. The electrode is composed of an n-InSb(100) substrate 608, upon which is a 200 nm n-InSb buffer layer 610. On the buffer layer 610 is a 1.2 μm thick layer of InAsSb 612 with ErSb nanoparticles 614 embedded in it.

Figure 7A:
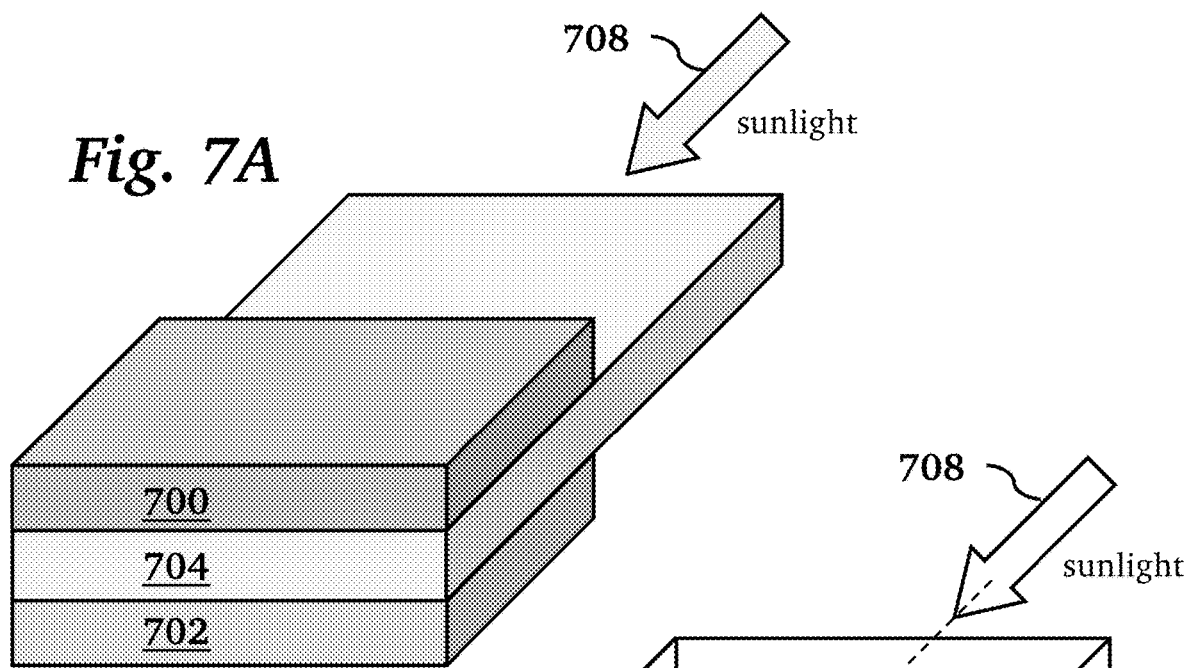
FIGS. 7A-C are schematic illustrations of an electrode and waveguide design according to an embodiment of the invention.
the invention including a concentrator.
Figure 7B:
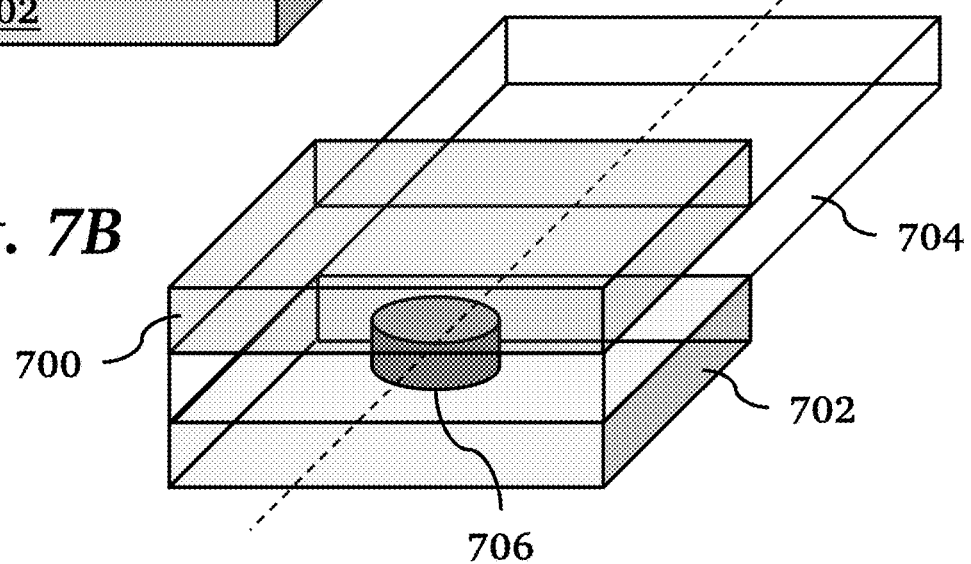
Figure 7C:
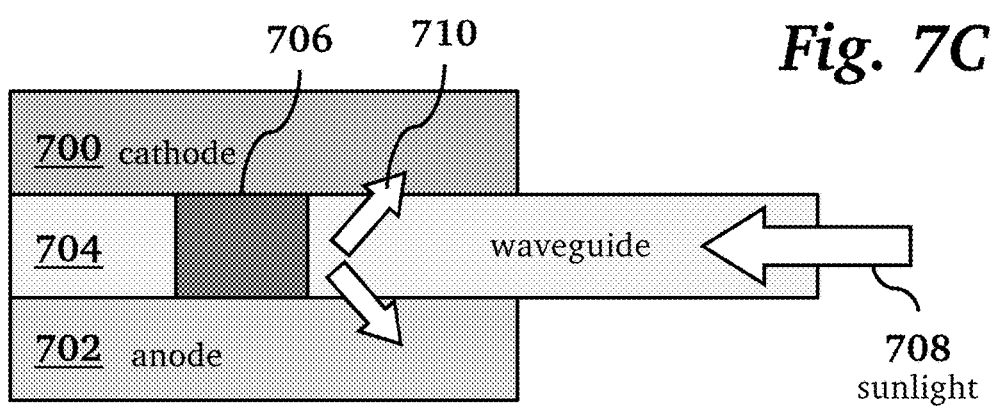

In embodiments of the invention, sunlight is efficiently guided by an optical waveguide so that it is directed to illuminate the back surface of each photoelectrode. FIGS. 7A-C are schematic illustrations of an electrode and waveguide design according to one embodiment of the invention. One end of an optical waveguide 704 is in contact with a cathode 700 above it and an anode 702 below it. These components are designed so that sunlight 708 entering the device at one end of the waveguide is efficiently guided to the opposite end of the waveguide 704 and directed to backside surfaces of the cathode 700 and anode 702, i.e., the surfaces in contact with the waveguide 704. An electrically conductive connector 706 embedded in waveguide 704 provides an electrical connection between cathode 700 and anode 702. The connector 704 also serves to scatter sunlight 708 so that the redirected light 710 interacts with the cathode 700 and anode 702. Although a single electrical conductor 706 is shown in FIG. 7B, multiple such electrical conductors can be embedded in the waveguide 704. FIG. 7C is a longitudinal cross sectional view of the structure of 7B along the dotted line. The structure shown in FIGS. 7A-C would be placed in a housing containing an electrolyte solution during operation, and it would preferably be oriented with the longitudinal axis vertical so that the generated gasses remain separated as they rise from the front sides of the cathode and anode.

Figure 7D:
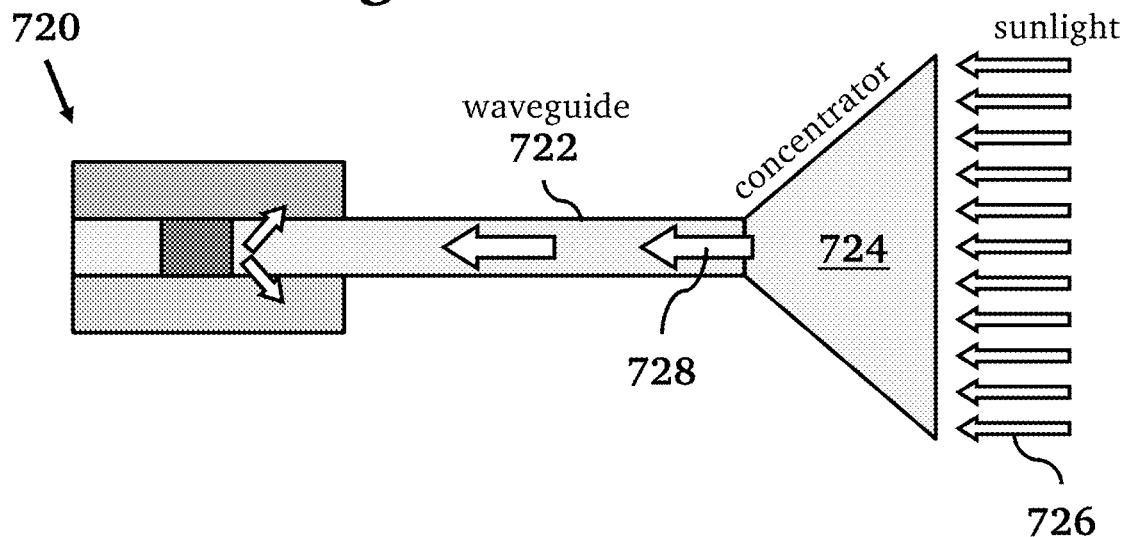
FIGS. 7D-E are schematic illustrations of embodiments of the invention including a waveguide solar concentrator.
Figure 7D:
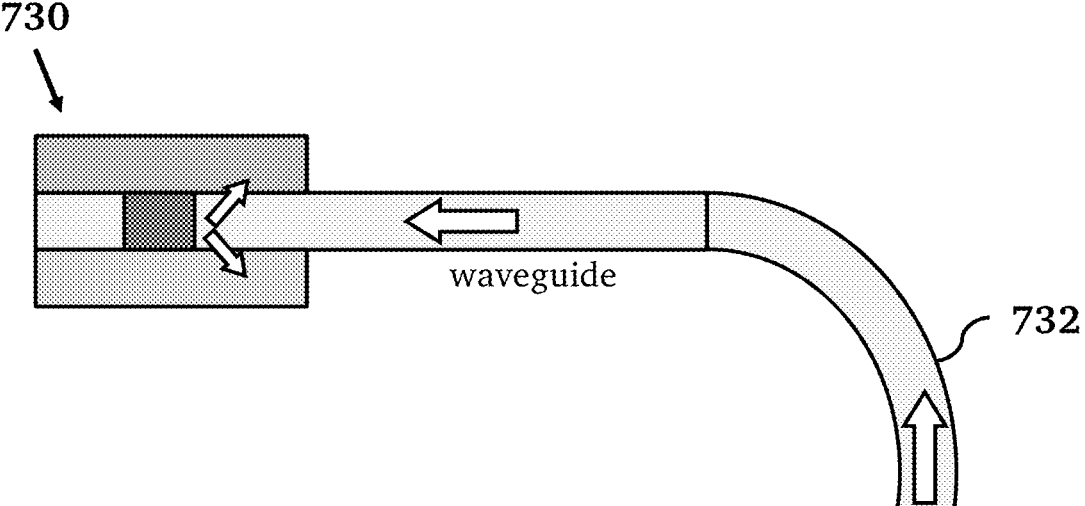
Figure 7E:
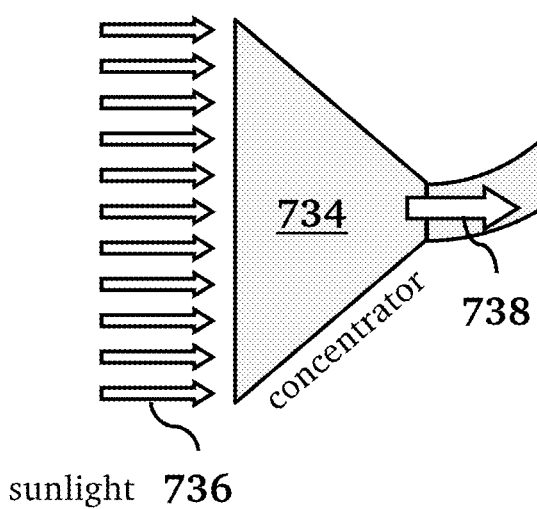

As illustrated in FIGS. 7D-E, further embodiments of the invention may include a waveguide concentrator coupled to or integrated as part of the waveguide. The waveguide concentrator concentrates light within the waveguide to increase the intensity, resulting in higher photon flux on the electrodes. Conventional solar concentrators based on geometrical optics (e.g., mirrors and lenses) are not suitable for PEC use, since such components require multiple line-of-sight optical paths.

FIG. 7D shows an embodiment of the invention where a structure 720 as described above in relation to FIGS. 7A-C further includes a waveguide concentrator 724 with a wide entrance for receiving sunlight 726 and a narrow exit coupled to a waveguide 722 for transmitting concentrated sunlight 728 into the waveguide 722. The waveguide can be made of any suitable material transparent to sunlight, e.g., a rigid material (e.g. quartz or borosilicate glass) or a flexible material. The waveguide can be straight or angled, curved, spiraled, or any configuration available to one of skill in the art depending on the application. For example, a flexible waveguide (e.g., optical fiber and thin glass plate) is illustrated in FIG. 7E to provide a light path with an arbitrary shape depending on a specific application. Sunlight 736 entering the concentrator 734 is concentrated 738 and coupled into a curved waveguide 732 which is then directed into a device 730 as described above in relation to FIGS. 7A-C. One of skill in the art in light of this disclosure can design the waveguide to minimize losses from optical transmission of the light while maintaining mechanical stability.

Figure 8:
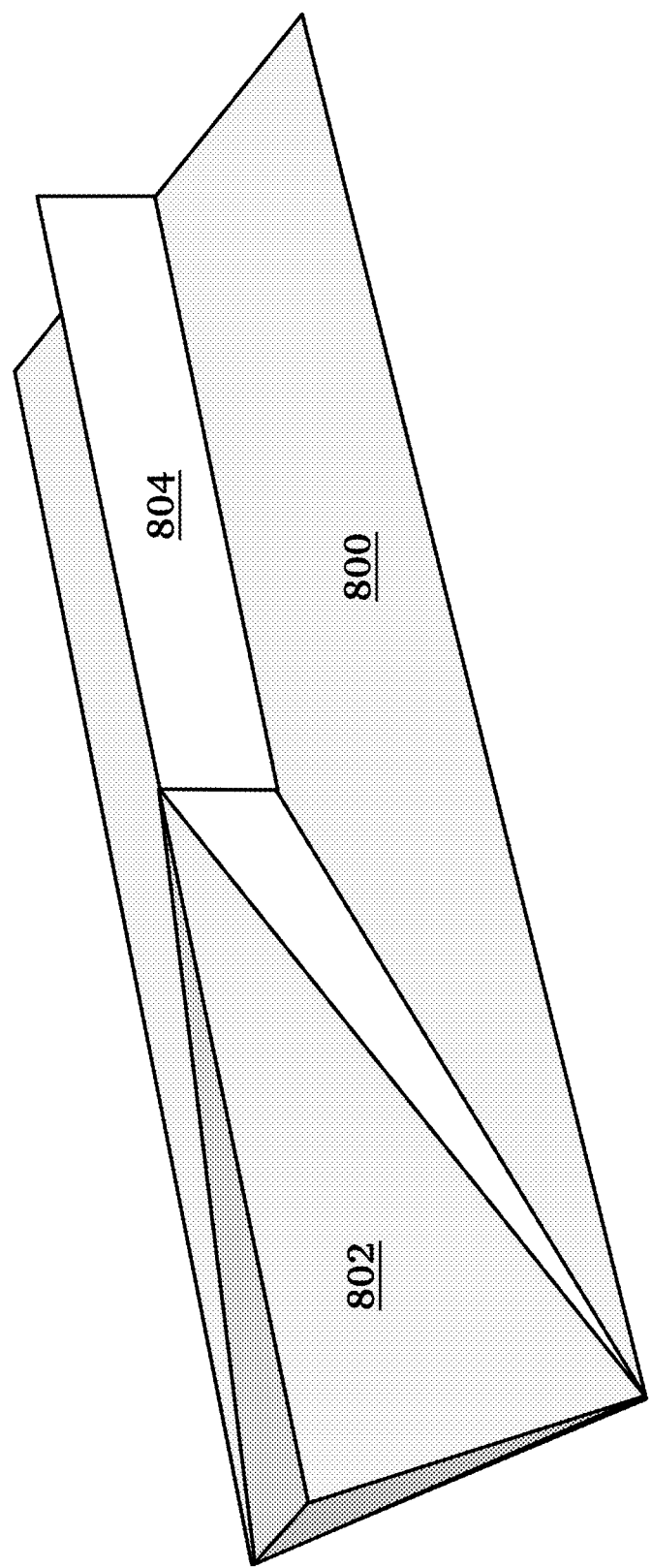
FIG. 8 is an illustration of a tapered waveguide optical concentrator for use in embodiments of the present invention.

FIG. 8 is an illustration of a tapered waveguide optical concentrator for use in embodiments of the present invention. The concentrator is made of an optically transparent material (e.g., aluminum oxide) shaped in a tapered waveguide formed on a substrate 800 that underwent thermal annealing. This tapered waveguide optical concentrator is designed for the visible spectral range using spatially varied refractive index. Sunlight enters from the left side with a wide entrance. The sunlight is concentrated as it travels through the tapered section 802 toward the right side where it is coupled into a normal waveguide section 804.

The invention claimed is:

1. A photoelectrochemical cell comprising:
   a cathode comprising a first semiconductor, a front cathode surface, and a back cathode surface opposite the front surface;
   an anode comprising a second semiconductor or a metal, and a front anode surface, a back anode surface opposite the front surface;
   an electrically conductive material connecting the cathode and the anode; and
   an optical waveguide comprising a proximal end coupled to the back cathode surface and to the back anode surface, and a distal end configured to couple sunlight into the waveguide;
   wherein the electrically conductive material is embedded in the optical waveguide;
   wherein the cathode is adapted for photoelectric generation of electron hole pairs at the back cathode surface and electrolytic generation of hydrogen at the front cathode surface;
   wherein the anode is adapted for photoelectric generation of electrons and holes at the back anode surface and electrolytic generation of oxygen at the front anode surface.

2. The photoelectrochemical cell of claim 1 wherein the cathode comprises semiconductor materials with different band gaps at the front cathode surface and the back cathode surface.

3. The photoelectrochemical cell of claim 2 wherein a back bandgap at the back cathode surface is adapted for photoelectric generation of the electron hole pairs by incident sunlight, and wherein a front bandgap at the front cathode surface is optimized for electrolytic production of hydrogen.

4. The photoelectrochemical cell of claim 1 where the cathode comprises a single crystalline, polycrystalline, or noncrystalline semiconductor.

5. The photoelectrochemical cell of claim 1 where the cathode comprises a Group IV semiconductor.

6. The photoelectrochemical cell of claim 5 where the cathode comprises Si, SiC, or SiGe.

7. The photoelectrochemical cell of claim 1 where the cathode comprises a Group III-V semiconductor.

8. The photoelectrochemical cell of claim 7 where the cathode comprises GaAs, GaP, InP, InGaP, or CuInGaSn.

9. The photoelectrochemical cell of claim 1 where the cathode comprises a Group II-VI semiconductor.

10. The photoelectrochemical cell of claim 9 where the cathode comprises CdSe, ZnS, or CdTe.

11. The photoelectrochemical cell of claim 1 where the cathode comprises a metal oxide.

12. The photoelectrochemical cell of claim 11 where the cathode comprises $Cu_2O$.

13. The photoelectrochemical cell of claim 1 where the anode comprises a Group II-VI semiconductor.

14. The photoelectrochemical cell of claim 13 where the anode comprises ZnSe.

15. The photoelectrochemical cell of claim 1 where the anode comprises a metal oxide.

16. The photoelectrochemical cell of claim 15 where the anode comprises ZnO, $WO_3$, $TiO_2$, $FeTiO_3$, $In_2O_3$, $SrTiO_3$, or $KTaO_3$.

17. The photoelectrochemical cell of claim 1 where the anode comprises Pt, Ru, Ni, Fe, Cr, Au, Cu, or Ag.

18. The photoelectrochemical cell of claim 1 further comprising a tapered optical waveguide concentrator at a distal end of the optical waveguide.

19. The photoelectrochemical cell of claim 1 further comprising a first housing encompassing the cathode, and a second housing encompassing the anode.

* * * * *